United States Patent
Vath

(10) Patent No.: US 7,367,292 B2
(45) Date of Patent: May 6, 2008

(54) FUEL COOLER WITH LAMELLAR INNER STRUCTURES FOR CONNECTING TO AN AIR-CONDITIONING SYSTEM OF A VEHICLE

(76) Inventor: Wolfgang Vath, Aschaffenburger Strasse 75, 63768 Hösbach (DE)

( * ) Notice: Subject to any disclaimer, the term of this patent is extended or adjusted under 35 U.S.C. 154(b) by 0 days.

(21) Appl. No.: 10/556,634

(22) PCT Filed: Sep. 22, 2003

(86) PCT No.: PCT/DE03/03128

§ 371 (c)(1),
(2), (4) Date: Dec. 27, 2005

(87) PCT Pub. No.: WO2004/104401

PCT Pub. Date: Dec. 2, 2004

(65) Prior Publication Data

US 2006/0219226 A1    Oct. 5, 2006

(30) Foreign Application Priority Data

May 10, 2003   (DE) ................................ 103 21 065

(51) Int. Cl.
*F01P 3/12* (2006.01)
*F01M 31/20* (2006.01)
*F28D 7/00* (2006.01)
*F28D 7/10* (2006.01)

(52) U.S. Cl. .................. 123/41.31; 123/541; 165/51; 165/153; 165/157; 165/159

(58) Field of Classification Search ............... 123/541, 123/196 AB; 165/166, 169, 51, 157, 159, 165/153

See application file for complete search history.

(56) References Cited

U.S. PATENT DOCUMENTS

| 4,335,782 | A | * | 6/1982 | Parker ..................... 165/166 |
| 4,898,141 | A | * | 2/1990 | Fiedler .................... 123/541 |
| 5,121,790 | A | * | 6/1992 | Persson ................... 165/140 |
| 5,251,603 | A | * | 10/1993 | Watanabe et al. ......... 123/541 |
| 5,887,555 | A | * | 3/1999 | Schmitz .................. 123/41.31 |
| 5,964,206 | A | * | 10/1999 | White et al. ............. 123/541 |

(Continued)

FOREIGN PATENT DOCUMENTS

DE    100 01 434 A1    8/2001

(Continued)

*Primary Examiner*—Stephen K. Cronin
*Assistant Examiner*—Ka Chun Leung
(74) *Attorney, Agent, or Firm*—Edwin D. Schindler

(57) ABSTRACT

A fuel cooler with lamellar inner structures for connecting to an air-conditioning system of a vehicle includes an outer housing having outer connections connected to an outer supply pipe and an outer discharge pipe for a first fluid with the outer connections being integrated into walls of the outer housing in a diagonally mismatched arrangement. An inner conduit cell, surrounded by the outer housing, has an inner supply pipe and an inner discharge pipe for a second fluid passing through the inner conduit cell, which includes lamellas oriented parallel to a direction of flow of the second fluid, with the first fluid coming into contact with an outer contact surface of the inner conduit cell prior to exiting the outer housing for creating a heat exchange between, and without a mixing of, the two fluids, which are fuel and a coolant.

10 Claims, 1 Drawing Sheet

U.S. PATENT DOCUMENTS

| | | | |
|---|---|---|---|
| 6,026,894 A * | 2/2000 | Bachinger | 165/166 |
| 6,182,748 B1 * | 2/2001 | Brost et al. | 165/167 |
| 6,247,523 B1 * | 6/2001 | Shibagaki et al. | 165/51 |
| 6,569,550 B2 * | 5/2003 | Khelifa | 429/13 |
| 2003/0000687 A1 * | 1/2003 | Mathur et al. | 165/166 |
| 2004/0069441 A1 * | 4/2004 | Burgers et al. | 165/41 |
| 2006/0124113 A1 * | 6/2006 | Roberts, Sr. | 123/541 |

FOREIGN PATENT DOCUMENTS

EP    1072783 A1    1/2001

* cited by examiner

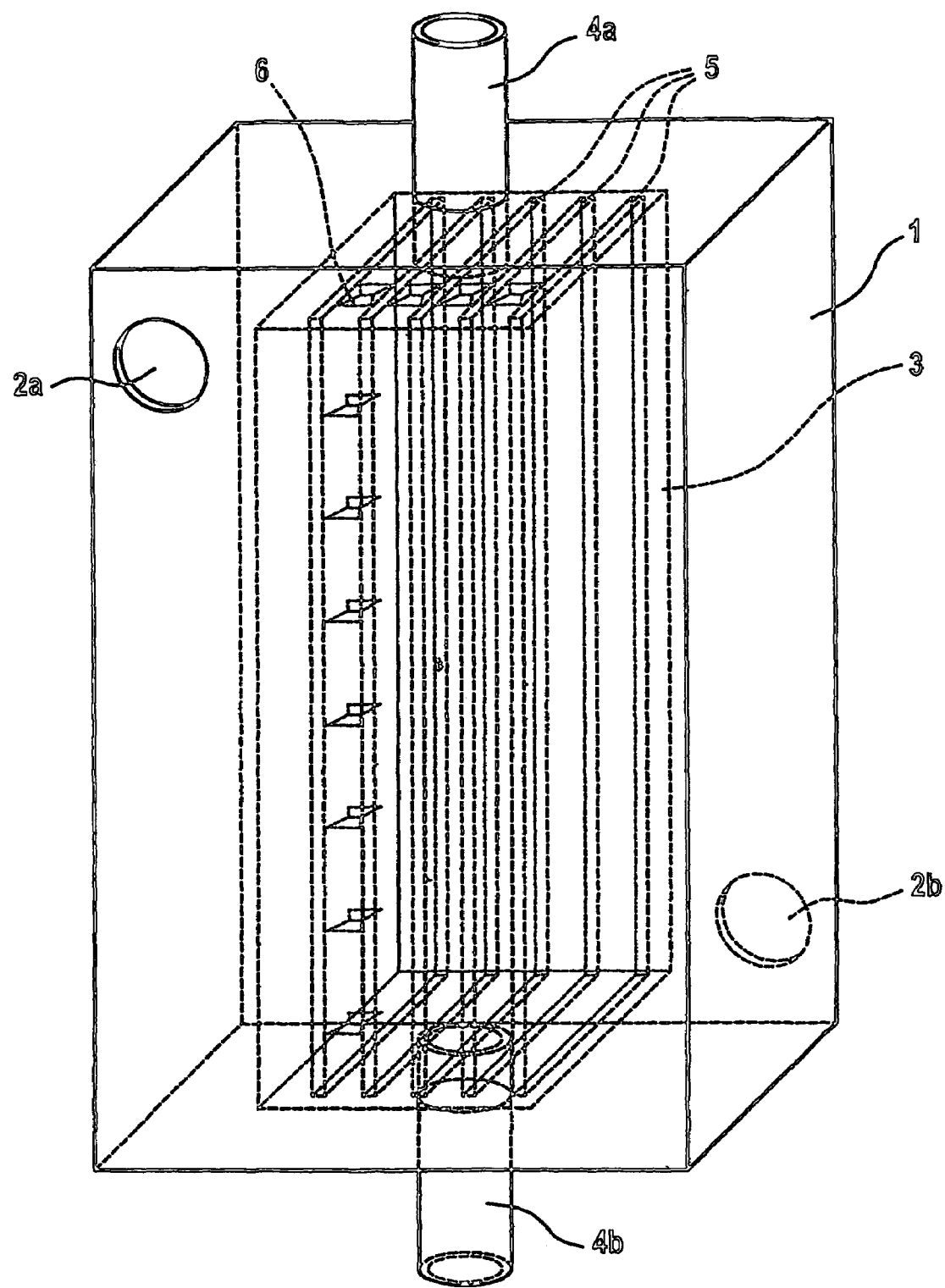

FUEL COOLER WITH LAMELLAR INNER STRUCTURES FOR CONNECTING TO AN AIR-CONDITIONING SYSTEM OF A VEHICLE

BACKGROUND OF THE INVENTION

Technical Field of the Invention

The invention relates to a vehicle with combustion engine, fuel tank and air conditioner and a heat exchanger connected with the fuel pipe that is integrated into the coolant circulation system of the air conditioner. The fuel cooling unit comprises an outer housing with connection for feeder and discharge pipes and a pipe running inside the outer housing.

DESCRIPTION OF THE PRIOR ART

Fuel may heat upon in a vehicle for various reasons. The fuel in the tank may heat up due to the heat produced by solar radiation or the fuel in the fuel pipes may heat up due to the radiation heat coming from drive sites and the radiation heat produced in the exhaust gas facility. The heated up fuel, steam bubble may develop in the fuel which interrupt the smooth operation of the engine. The technical term used for these little interruptions is "misfire". This problem particularly occurs when driving at high speeds and in case of compressor and turbo engines with a high consumption. That is why engineers have been making effort to develop devices for cooling the fuel for long time. This is reflected by the large number of patents and disclosure documents describing fuel cooling units.

When taking a closer look at these documents that deal with the interior design of the fuel cooling unit it becomes apparent that these devices generally refer to improvement inventions aimed at increasing the cooling effect which is mainly determined by the size of the heat transmission surface and the distribution of the coolant. That is why design modification efforts have been made in order to enlarge this heat transmission surface to enhance distribution of coolant in the majority of devices designed as fluid-heat exchangers. The efforts made to improve the coolant distribution aim at flushing the fuel-carrying pipes with coolant homogenously. The following is a short description of the documents to be regarded among state-of-the-art papers.

The device described in DE 34 40 060 refers to a fuel cooling unit where the fuel to be cooled is pumped through a curled hose which has the shape of a coil. This curled hose is radially supported by the inner wall of the radiator housing, while the cylindrical housing is flushed with coolant in axial direction. Due to restricted space available and bending problems, the coil has been made in 5 different individual pieces for this device. This device shows to major disadvantages: low cooling performance and the difficult manufacturing process of the coil.

Document DE 41 10 264 A1 outlines a recommendation for improvement of the cooling performance of the device described in DE 34 40 060 A1: In order to avoid the effect that the cooling performance stays constant despite higher coolant throughput or may even be reduced, the core cross-section of the fuel-carrying coil was filled with a body on which the fluid is flowing. This flow body was designed as twist sheet in this case which can be inserted between two adjoining windings of the curled hose coil. The contours of this twist sheet redefine the flowing cross-section going through the coil inside the housing and lead to a more homogenous flushing of the fuel-carrying coil.

Document DE 37 40 811 A1 recommends a spherical surface type housing instead of the cylindrical basic shape of the fuel cooling unit used so far which is fitted with a spiral with the fuel to be cooled in a position that allows the windings of the spiral to be positioned diagonally to the coolant stream. This subjects the stream of the coolant to new thermal start-up procedures at each winding which leads to turbulent currents which ensure good flushing of the fuel-carrying pipes.

Document DE 44 37 167 A1 describes a fuel cooling unit which shows a much larger heat transmission surface. Cylindrical bellows are used in this device as the major component of the fuel cooling unit between the ends of a fuel-feeding and a fuel-discharging pipe. The fuel cooling unit is equipped with a housing that consists of a hollow cylinder section with fuel feeding and fuel-discharging pipe and a lateral edge. ring-waved bellows are positioned inside the housing cover in a radial distance which is fixed on a hollow cylindrical guidance body of the same length with no play.

The guidance body is equipped with a wall in the current cross-section that is inclined towards the current direction which ranges over the entire length of the guidance body which is connected in one piece with its front and rear end as related to the current direction of the coolant with the adjoining end of the guidance body. Openings are located at both sides of the wall in the hollow cylindrical cover of the guidance body which are positioned in diametrically opposed to each other. The openings positioned in parallel along the axle of the cover line of the guidance body terminate on the outside of the guidance body in the flanks of the all-round bellows curves open towards the inside while fuel is being transported in the flanks of the bellows curves open towards the outside in the opposite direction. The fuel is permanently forced alongside the bellows curves open towards the inside through the wall positioned in an inclined position towards the current direction of the fuel so that on such enlarged heat transmission surface there can be an optimal heat exchange with the fuel streaming on the other side of the flanks.

The complicated technical design and the necessity for exact fixation of the guidance element which is a material precondition for a correct feed of fuel or coolant to the individual bellows curves are disadvantages of this device. Furthermore, no large throughput rates are possible due to the small cross-section of the bellows curves Connection of a fuel cooling unit to the coolant circulation system of the air condition is already state-of-the-art: Document DE 37 25 664 A1 describes the installation of a fuel cooling unit not further described regarding its inner design into the coolant circulation before the evaporator, while document DE 33 30 250 A provides for the installation of a fuel cooling unit not further described in more detail, either, between evaporator and compressor.

SUMMARY OF THE INVENTION

The invention is associated with the problem of designing a fuel cooling unit to be installed into vehicles with air conditioning, which offers a heat exchange surface of sufficient size and of a simple design in order to ensure a homogenous distribution of the coolant, so that a high fuel throughput rate can be guaranteed at high speeds.

In order to solve this task, the invention describes a fuel cooling unit where the pipe (3) located inside the outer housing is widened to a cell and where the cell created by widening the pipe (3) is equipped with lamellas (5) at the inside in parallel position to the current direction.

The core piece of the invention is based on the idea that a contact surface for heat exchange between fuel and coolant is created where the areas next to the contact surface are designed to guarantee quicker heat exchange. That is why two housings were fit into one another and additionally, a network structure was integrated in the interior of the inner housing consisting of lamellas with cross-links. The cross-links between the lamellas positioned in current direction provide for a quick heat exchange between the individual lamellas at the one hand and ensure a homogenous mix of the coolant in the relevant clearance spaces. This constant mixing of the coolant is another important precondition for a quick heat exchange.

The advantages of the fuel cooling unit as outlined in this invention are numerous. Cooling of the fuel prevents the development of steam bubbles and evaporation of fuel additives. This supports optimal combustion of the fuel with minimum emission. This results in a smooth idle operation and, in particular, improved performance of engines with higher fuel consumption. Higher engine performance and better fuel economy could be proved by measurements. Furthermore, the heat exchanger as outlined in the invention supports trouble-free new start of engines which are warm from operation. Due to the fact that cooled fuel can be compressed more easily, the strongest effect of the fuel cooling unit as outlined in the invention is achieved for compressor and turbo engines. The lamella-type structures inside the fuel cooling unit accelerate heat transportation to both sides of the heat transmission surface and stabilise the outer housing and the inner cells whenever higher pressures occur.

There are two designs available for the fuel cooling unit as outlined in the invention. The outer housing may be integrated into the fuel pipe between the fuel tank and fuel pump or into the coolant circulation system of the air conditioner. If the first option is chosen, i.e., installation in the outer housing of the fuel pipe, the inner cell will be integrated into the coolant circulation system of the air conditioner. In case the second design is preferred, it might be possible to integrate the inner cell into the fuel pipe and to connect the outer housing to the coolant circulation system of the air conditioner. (The first preferred option was used for test measurements performed so far, i.e. the outer housing was integrated into the fuel pipe between the fuel tank and fuel pump, while the inner cell was connected to the coolant circulation of the air conditioner.)

Based on another invention feature, the fuel cooling unit can also be integrated into the coolant circulation system before, or after, the evaporator of the air conditioner.

If the fuel cooling unit is integrated into the coolant circulation system after the evaporator, this will result in a relatively limited cooling of the fuel. However, cooling performance will be higher, if the fuel cooling unit is integrated into the cooling circulation system before the evaporator.

The invention further provides that the current direction of the fuel inside the fuel cooling unit is moving in the opposite direction of the current direction of the coolant. The opposite current direction of fuel and coolant will beneficially result in an improved cooling performance.

Another material feature of the invention is that the sections not filled by the inner cell inside the outer housing are also equipped with lamellas which are positioned in parallel towards the current direction and which in a specially preferred design are linked to a network structure like the lamellas inside the inner cell by additional cross-links. The network structure in both hollow bodies provides for an acceleration of the heat transport to the lamellas located further away from the border surface and results in a swirling of the fluids further optimizing heat transport and to a homogenous flushing of the border surface towards both sides.

Another particularly preferred design of the fuel cooling unit outlined in the invention provides that the outer housing and the cell in the interior consist of six side surfaces in vertical position to each other each. The middle lines of the rectangular parallelepiped hollow bodies meet in the assembled fuel cooling unit. In this case the inner cell is shorter in longitudinal direction than the outer cell so that there remains a clearance between the two hollow bodies which is filled by fuel and coolant in the operating condition.

Another preferred design of the fuel cooling unit outlined in the invention provides that the outer height of the rectangular parallelepiped cell corresponds exactly with the inner height of the outer housing so that the inner cell is optimally fitted with its top and bottom side without any clearance in the outer housing. Since the two pipe connections of the outer housing are integrated into each respective wall of the top and bottom side of the housing in a diagonally mismatched position, the inner cell is flushed by fuel or by coolant at least two long sides and at the two front sides in the operating condition in this preferred design.

It corresponds to the idea of the invention that the components used to design the outer housing and the inner cell and the lamellas and the cross-links inside both hollow bodies are made of a metal with high thermal conductivity such as aluminium or copper. When using aluminium, tungsten inert gas welding (wig welding) with a needle is used to connect the components. This way the connections, which have different sizes because of the various throughput levels, and the fine-steel coated fuel hoses which also may have different diameters, can be fixed. The different connection sizes are adapted to each vehicle and engine variant helping to achieve the best possible engine performance.

BRIEF DESCRIPTION OF THE DRAWING FIGS.

For further details and features of the invention, please refer to the following descriptive part of the drawing. The drawing and the pertaining description are not designed to limit the invention, but should render further detailed information.

DETAILED DESCRIPTION OF THE DRAWING FIGS.

FIG. 1 shows one of several possible designs of the fuel cooling unit as outlined in the invention. Inner cell 3 is positioned inside outer housing 1. Connections 4a and 4b belonging to inner cell leave housing 1 on the front sides. Lamellas 5 positioned in current direction and cross-links not completely illustrated can be seen inside the inner cell. The cross-links provide for a mixing of the fluids when flowing through the lamellas thereby supporting heat exchange.

The connections of the outer housing 2a and 2b are located in diagonally mismatched position on the two side surfaces of outer housing 1. The space not filled by inner cell 3 inside outer housing 1 is not filled with lamellas and respective cross-links in the example illustrated here. Of course, another design could be possible where this clearance is filled with lamellas and cross-links like shown for inner cell 3.

The invention claimed is:

1. A fuel cooler with lamellar inner structures for connecting to an air-conditioning system of a vehicle, comprising:
   an outer housing having outer connections able to be connected to an outer supply pipe and an outer discharge pipe for a first fluid, said outer connections being intergrated into walls of said outer housing in a diagonally mismatched arrangement; and,
   an inner conduit cell surrounded by said housing and having an inner supply pipe and an inner discharge pipe for a second fluid passing through said inner conduit cell, said inner conduit cell having lamellas oriented parallel to a direction of flow of said second fluid, with said first fluid coming into contact with an outer contact surface of said inner conduit cell prior to exiting said outer housing for creating a heat exchange between, and without a mixing of, said first fluid and said second fluid.

2. The fuel cooler with larnellar inner structures for connecting to an air-conditioning system of a vehicle according to claim 1, wherein said first fluid is a fuel and said second fluid is a coolant.

3. The fuel cooler with lamellar inner structures for connecting to an air-conditioning system of a vehicle according to claim 1, wherein said first fluid is a coolant and said second fluid is a fuel.

4. The fuel cooler with lamellar inner structures for connecting to an air-conditioning system of a vehicle according to claim 1, wherein a direction of flow of said first fluid through said outer housing is opposite to the direction of flow of said second fluid through said inner conduit cell.

5. The fuel cooler with lamellar inner structures for connecting to an air-conditioning system of a vehicle according to claim 1, further comprising additional lamellas within a portion of said outer housing not occupied by said inner conduit cell, said additional lamellas being positioned parallel toward a direction of flow of said first fluid through said outer housing.

6. The fuel cooler with lamellar inner structures for connecting to an air-conditioning system of a vehicle according to claim 1, wherein said inner conduit cell has a cuboid structure.

7. The fuel cooler with lamellar inner structures for connecting to an air-conditioning system of a vehicle according to claim 1, wherein said outer housing is made of a metal having a high thermal conductivity.

8. The fuel cooler with lamellar inner structures for connecting to an air-conditioning system of a vehicle according to claim 1, wherein said inner conduit cell is made of a metal having a high thermal conductivity.

9. The fuel cooler with lamellar inner structures for connecting to an air-conditioning system of a vehicle according to claim 1, wherein said lamellas of said inner conduit cell are made of a metal having a high thermal conductivity.

10. The fuel cooler with lamellar inner structures for connecting to an air-conditioning system of a vehicle according to claim 1, wherein said outer connections of said outer housing include a first outer connection integrated into a top wall of said outer housing and a second outer connection integrated into a bottom wall of said outer housing in said diagonally mismatched arrangement.

* * * * *